US009675204B2

(12) United States Patent
Cahen

(10) Patent No.: US 9,675,204 B2
(45) Date of Patent: Jun. 13, 2017

(54) BEVERAGE MACHINE FOR DIFFERENT SPATIAL ENVIRONMENTS

(75) Inventor: Antoine Cahen, Lausanne (CH)

(73) Assignee: Nestec S.A., Vevey (CH)

(*) Notice: Subject to any disclaimer, the term of this patent is extended or adjusted under 35 U.S.C. 154(b) by 686 days.

(21) Appl. No.: 13/882,076

(22) PCT Filed: Oct. 20, 2011

(86) PCT No.: PCT/EP2011/068365
§ 371 (c)(1),
(2), (4) Date: Apr. 26, 2013

(87) PCT Pub. No.: WO2012/055767
PCT Pub. Date: May 3, 2012

(65) Prior Publication Data
US 2013/0213238 A1    Aug. 22, 2013

(30) Foreign Application Priority Data
Oct. 27, 2010 (EP) .................................. 10189105

(51) Int. Cl.
*A47J 31/44* (2006.01)
*A47J 31/36* (2006.01)
*A47J 31/46* (2006.01)

(52) U.S. Cl.
CPC ....... *A47J 31/4403* (2013.01); *A47J 31/4485* (2013.01); *A47J 31/46* (2013.01); *A47J 2201/00* (2013.01)

(58) Field of Classification Search
CPC ................ A47J 31/4485; A47J 2201/00; A47J 31/4403; A47J 31/46

USPC ....................................................... 99/289 R
See application file for complete search history.

(56) References Cited

U.S. PATENT DOCUMENTS

| 7,013,794 B2 | 3/2006 | Rolland | |
|---|---|---|---|
| 2003/0037680 A1* | 2/2003 | Rolland | A47J 31/4428 99/279 |
| 2008/0148950 A1* | 6/2008 | Cahen | A47J 31/4482 99/275 |

FOREIGN PATENT DOCUMENTS

| CH | WO 2009130099 A1 * | 10/2009 | .......... A47J 31/3623 |
|---|---|---|---|
| DE | 9400834 | 3/1994 | |
| DE | 9400834 U1 * | 3/1994 | ............ A47J 31/005 |
| DE | 202009006129 | 7/2009 | |
| EP | 1867260 | 12/2007 | |
| EP | 1878368 | 1/2008 | |
| WO | 2007017849 | 2/2007 | |
| WO | 2008104751 | 9/2008 | |

OTHER PUBLICATIONS

European Notice of Opposition Action for Application No. 11772975.6-1653, Dated Feb. 3, 2016, 19 pages.

* cited by examiner

*Primary Examiner* — Quang D Thanh
*Assistant Examiner* — Kuangyue Chen
(74) *Attorney, Agent, or Firm* — K&L Gates LLP

(57) ABSTRACT

A beverage preparation machine (1) comprising: a body (2) having one or more outer faces (21,22) and a beverage outlet for delivering a beverage on a beverage dispensing area (27); and a module (3) operatively connected to the body adjacent to one of said one or more outer faces. The module is movable into a plurality of different operative connection positions along said one or more outer faces of the body.

17 Claims, 3 Drawing Sheets

BEVERAGE MACHINE FOR DIFFERENT SPATIAL ENVIRONMENTS

CROSS REFERENCE TO RELATED APPLICATIONS

The present application is a National Stage of International Application No. PCT/EP2011/068365, filed on Oct. 20, 2011, which claims priority to European Patent Application No. 10189105.9, filed Oct. 27, 2010, the entire contents of which are being incorporated herein by reference.

FIELD OF THE INVENTION

The present invention concerns a beverage preparation machine that has a body and a module adjacent to an outer face of the module, such as a storage reservoir for storing a supply of ingredient and/or waste material, in particular the machine is arranged to use capsules of a flavouring ingredient that is mixed with a liquid such as water to prepare a beverage.

For the purpose of the present description, a "beverage" is meant to include any human-consumable liquid substance, such as tea, coffee, hot or cold chocolate, milk, soup, baby food, etc. . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Beverage preparation machines have been known for a number of years. For example, U.S. Pat. No. 5,943,472 discloses a water circulation system between a water reservoir and a hot water or vapour distribution chamber of an espresso machine. The circulation system includes a valve, metallic heating tube and pump that are connected together and to the reservoir.

The beverage preparation machine typically includes a housing containing a beverage processing module and a liquid reservoir that is removably connected to the housing and in fluid communication with the beverage processing module. Examples of such beverage preparation machines are disclosed in EP 1 208 782, EP 1 267 687, EP 1 686 879, EP 1 731 065, EP 1 829 469, EP 1 864 598, EP 1 865 815, EP 1 867 260, EP 1 878 368, EP 2 222 210, EP 2 222 211, EP 2 222 212, EP 2 227 121, EP 2 227 122, US 2008/0006159, U.S. Pat. No. 7,165,488, WO 2007/111884, WO 2009/074553 and WO 2010/015427.

EP 1 267 687 discloses a beverage machine having a vertically extending water reservoir that is pivotable about a vertical axis and fixed against the machine's housing by an upper hook part formed by the rim of the reservoir and engaging with a hook retainer formed in the housing. Furthermore, the reservoir is covered with a removable lid extending over part of the machine's housing.

SUMMARY OF THE INVENTION

A preferred object of the present invention is to provide a beverage preparation machine that can be positioned in an external environment, e.g. kitchen or office, with a great flexibility.

Another preferred object of the present invention is to provide a beverage preparation machine that may be optimally placed in a variety of different spatial configurations.

The beverage preparation machine has a body bearing a beverage outlet for delivering a beverage over a beverage dispensing area. The body may be configured for preparing a beverage by circulating a liquid, such as water, via a flavouring ingredient, such as ground coffee and/or tea leaves and/or cacao and/or milk e.g. powder milk. The flavouring ingredient may be a pre-portioned ingredient supplied into the machine body within a capsule.

Furthermore, the machine includes a module. The module is typically external to the body and has an operative configuration for carrying out a sub-function of the beverage preparation machine, in particular providing a supply of ingredient such as a e.g. water, or collecting waste material such as a residual beverage or used ingredient or a used cleaning/rinsing fluid. The module is in particular removable from the machine, e.g. for normal servicing, e.g. refilling and/or emptying. Typically, the body is a main body, i.e. including the predominant part of the machine, and the module is secondary part of the machine, e.g. an accessory.

The module is operatively connected to the body adjacent to one of the one or more outer body faces. When the module is operatively connected to the body, the module is in position for carrying out the dedicated sub-function of the beverage preparation machine, e.g. supplying an ingredient and/or collecting waste material.

The body may include a pump for circulating liquid from a source of liquid, e.g. from the module, to the beverage outlet. The pump may be a reciprocating piston pump or a rotary pump. The body can include a thermal conditioner, e.g. a heater, for thermal conditioning of liquid from a liquid source circulated to the beverage outlet. In particular, the machine's body contains a mixing for mixing beverage ingredients, in particular a flavouring ingredient, e.g. coffee and/or tea and/or cacao and/or milk, and a liquid such as water. The mixing unit may be a brewing unit for brewing an ingredient.

For instance, the machine is a coffee, tea, chocolate or soup preparation machine, such as a self-contained table-top machine that can be electrically connected to the mains, e.g. at home or in an office. In particular, the machine is arranged for a beverage by passing hot or cold water or another liquid through a capsule containing a flavouring ingredient of the beverage to be prepared, such as ground coffee or tea or chocolate or cacao or milk powder.

For example, the preparation machine comprises: an ingredient processing arrangement including one or more of a liquid reservoir, e.g. the above module, liquid circulation circuit, a heater, a pump and a mixing unit, e.g. a brewing unit, arranged to receive ingredient capsules for extraction and evacuate capsules upon extraction; a seat to which capsules are evacuated from the preparation unit; and a receptacle having a cavity forming a storage space for collecting used ingredient. The receptacle is insertable into the seat for collecting capsules and is removable from the seat for emptying the collected capsules. Examples of such ingredient processing arrangements are disclosed in WO 2009/074550, WO 2009/130099 and WO 2010/015427.

The beverage machine may include one or more of the following components:
a) a brewing unit for receiving an ingredient of this beverage, in particular a pre-portioned ingredient supplied within a capsule, and for guiding an incoming flow of liquid, such as water, through said ingredient to a beverage outlet;

b) an in-line heater, such as a thermoblock, for heating this flow of liquid to be supplied to the brewing unit;
c) a pump for pumping this liquid through the in-line heater;
d) one or more fluid connecting members for guiding this liquid from a source of liquid, such as a tank of liquid, to the beverage outlet;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the brewing unit, the in-line heater, the pump, a liquid reservoir, an ingredient collector, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151.

In accordance with the invention, the module is movable into a plurality of different operative connection positions along said one or more outer faces of the body.

The invention thus provides a beverage preparation machine comprising a body and a module that is adjacent to the body and that is operatively connected to the body and movable along and about one or more peripheral outer faces of the body into different positions. Typically, the outer faces of the body are side faces, e.g. front, rear and/or lateral faces, and/or a top face. By moving the module from a first location of a peripheral part of the body to a different location of such peripheral part, at least part of the space occupied by the module in the first position is freed. Thus, the machine's outer shape, namely the overall shape of the body and the module connected thereto, in particular the footprint or plan view thereof, is changed. Therefore, the machine may be placed in a different spatial environment corresponding to the changed shape and use optimally the available space for placing the machine. For instance, when machine is placed in a corner, e.g. a kitchen corner, the body and module may be arranged in a configuration at an angle corresponding to the angle of the corner to match the shape of the corner. When the machine is placed along a straight wall, the body and module may be aligned so as to match the wall.

Hence, depending on the relative position of the module and the body, the machine can take different outer configurations (shapes) that are adapted to different environments, e.g. the machine may be placed along a wall or in a left or right corner or along a straight wall of a room, in an optimal spatial arrangement of the machine in its environment.

Thus, the machine of the present invention has an advantageous arrangement for adapting the machine's shape to match different spatial environments in which the machine is placed for normal use.

For instance, the module may be translationally movable along the one or more outer body faces and/or rotatably movable around the body, in particular over a pivoting angle of at least 90°, such as up to 180°, optionally of at least 270° or 360°.

The module can be movable into a plurality of different positions of operative connection adjacent and along a body face. The body may have a first body face and a second body face, the module being movable into a first position of operative connection adjacent to the first body face and into a second position of operative connection adjacent to the second body face, optionally the body having a third body face, in particular facing the first or second body face, the module being movable into a third position of operative connection adjacent to the third body face.

When the module is movable from one face to another face of the body, the module is "adjacent" to the face which the module contacts or is closest of all the faces next to which the module may be in operative connection.

The module may be movable into an infinite number of different positions of operative connection. The module can be movable into a limited number of different positions of operative connection, in particular a number of positions in the range from 2 to 5 such as 3 or 4.

The module may have one or more module faces, the module face(s) and the body face(s) being generally parallel or tangential in the plurality of different positions of operative connection.

The machine may include a plurality of such modules, e.g. two or three such modules, operatively connected to the body adjacent to one or more outer body faces, each module being movable into a plurality of different operative connection positions along said one or more outer faces of the body. The modules may be connected simultaneously to the same body. The modules may be connected adjacent different faces of the body, in particular adjacent opposite lateral faces, or adjacent a lateral face and adjacent a rear face of the body. The modules of this plurality of modules may be of similar or different nature. For example, a liquid reservoir may be connected to the body as a first module and a waste material collector may connected to the body as a second module.

In one embodiment, the module is connected to the body by a connection device, such as a rigid connection device. The connection device may include a communication channel extending from the body to the module. The communication channel can be configured to guide a material, such as a fluid e.g. a liquid, and/or a flow or energy, such as information and/or power, between the body and the module. The channel may be connected to the body by a flexible connector, such as a flexible cable and/or a flexible tube. The channel can be connected to the body by a rigid electric and/or fluid connection with a bearing.

When the machine includes a plurality of modules, each module may be connected to the body by a dedicated connection device, such as a rigid connection device. It is also possible to provide a rigid connection device that is arranged for connecting more than one module to the body, e.g. two or three modules.

As indicated above, the module may comprise a collection reservoir for collecting waste material, such as waste beverage and/or ingredients upon use and/or a cleaning fluid. Conversely, the module can be a supply reservoir for supplying an ingredient, in particular a liquid such as water, to the body via the connection device.

BRIEF DESCRIPTION OF THE DRAWINGS

The invention will now be described with reference to the schematic drawings, wherein.

DETAILED DESCRIPTION

Figure 1:
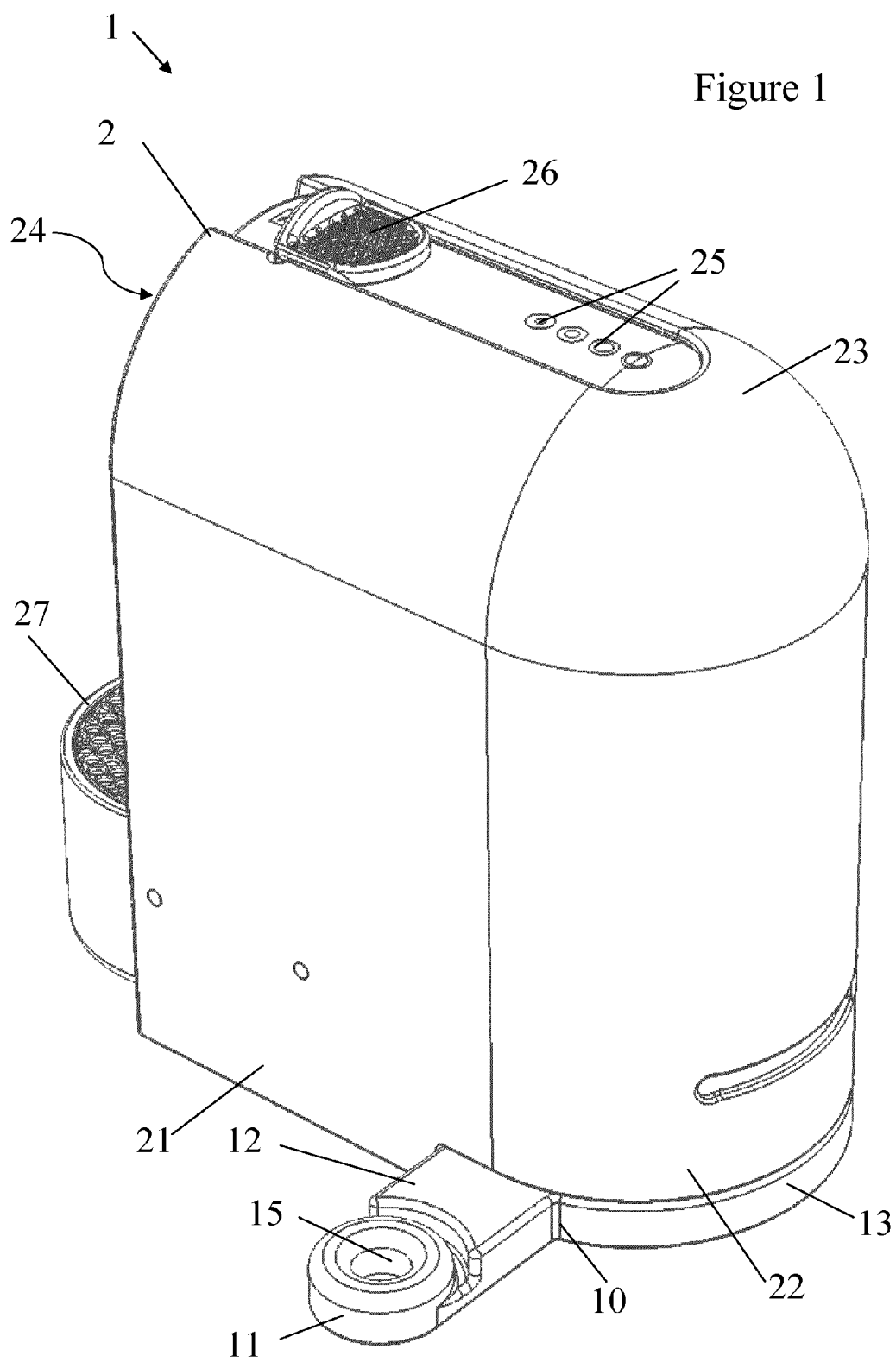
FIGS. 1 to 3 illustrate a beverage preparation machine in different configurations according to the invention.
Figure 2:
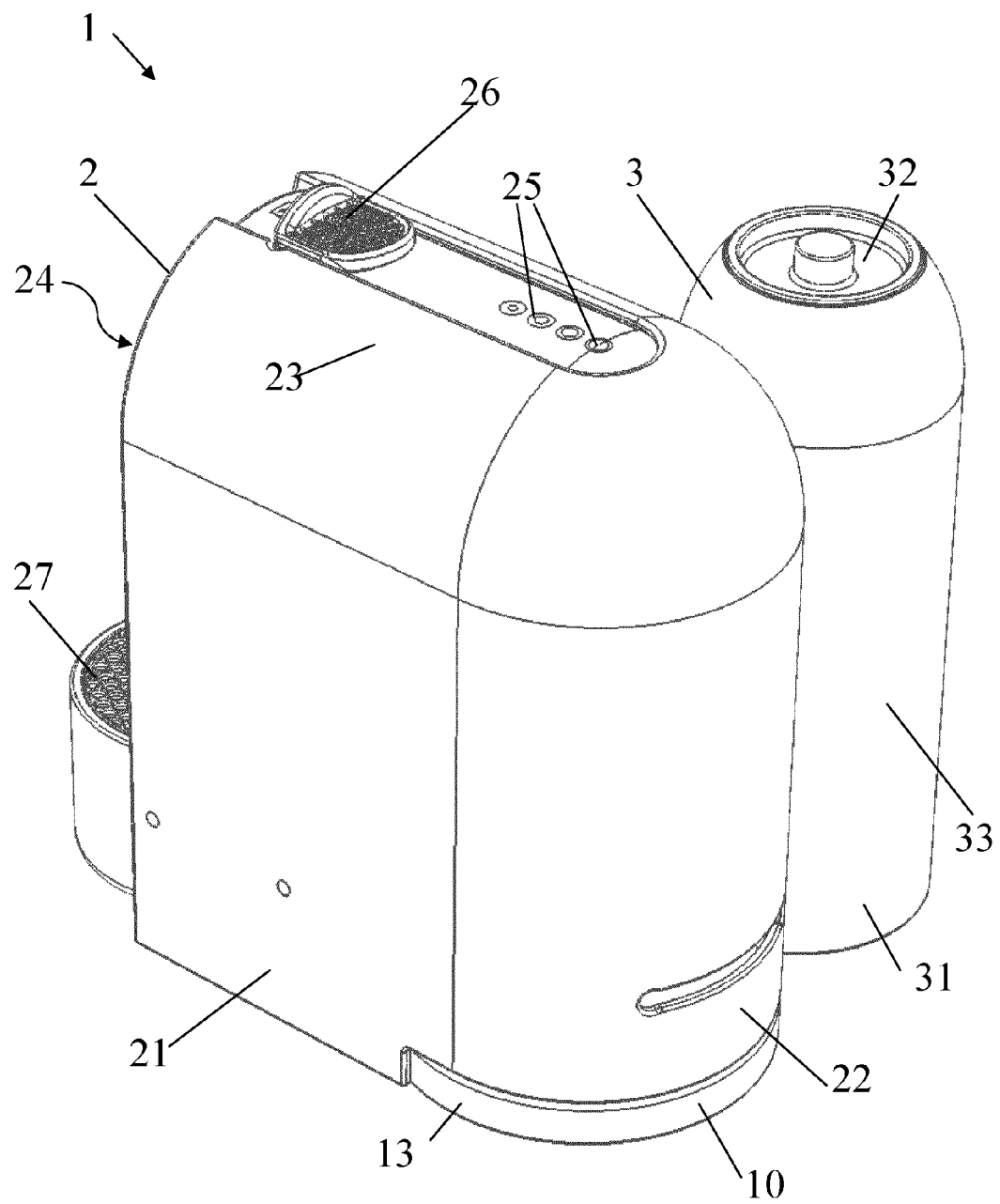
Figure 3:
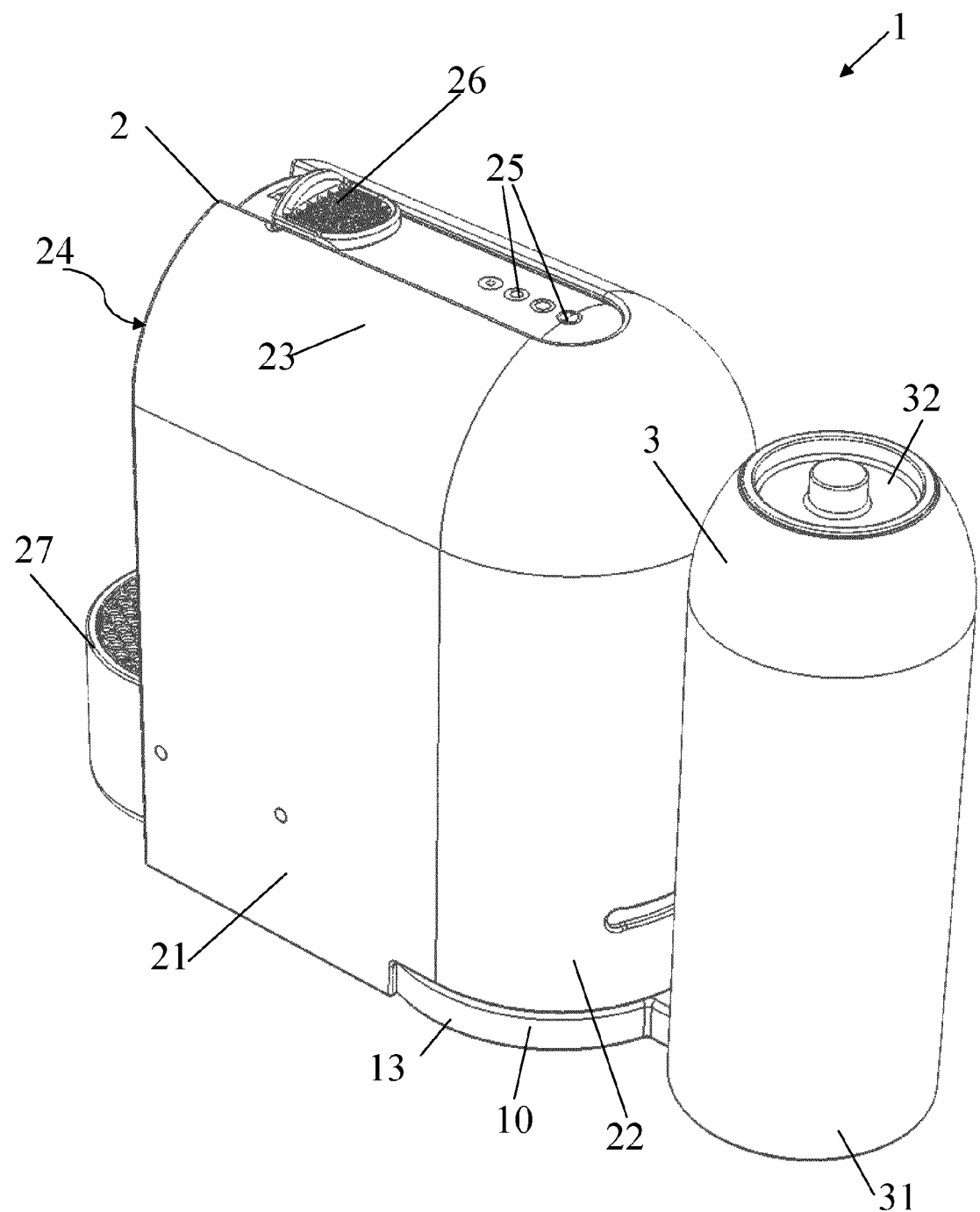

FIGS. 1 to 3 illustrate an embodiment of a beverage preparation machine 1 and parts thereof according to the invention, in particular a machine for preparing a beverage by circulating a liquid via a flavouring ingredient, e.g. tea or ground coffee, such as a pre-portioned ingredient contained in a capsule.

A beverage preparation machine of this type is described in greater details in WO 2009/043630 and in WO 2010/015427.

Machine 1 has a main body 2 and a module 3 connected thereto. Body 2 has a front face 24 bearing a beverage outlet (not shown) for dispensing a beverage onto a beverage dispensing area 27, e.g. a cup or mug support. Such support is known in the art, e.g. as disclosed in EP 1 867 260. Machine 1 has facing lateral outer faces 21, a semi-circular rear outer face 22 and a semi-circular top face 23.

Top face 23 bears a user-interface 25 for a user to operate machine 1 and an ingredient inlet channel 26 for introducing a flavouring ingredient, in particular supplied within a capsule, into the machine. Channel 26 may cooperate with a gate for opening and closing the channel.

Machine 1 has a module 3 operatively connected to body 2 adjacent to one of the module's outer faces 21,22. Module 3 is movable into a plurality of different operative connection positions along lateral faces 21 and rear face 22. Module 3 is connected to body 2 via a connection device 10.

FIG. 1 illustrates machine 1 with a connection device 10 in position for positioning module 3 (not shown) adjacent to right-hand lateral face 21. For instance, module 3 is pluggable to device 10. FIG. 2 shows machine 1 with connection device 10 in position for positioning module 3 adjacent to left-hand lateral face (facing lateral face 21). FIG. 3 illustrates machine 1 with connection device 10 in position for positioning module 3 adjacent to rear face 22.

Module 3 is rotatably movable around lateral face 22 and rear face 23 of body 2 over a pivoting angle of about 180° from one side to the opposite side of body 2. Alternatively, the module could be translationally mounted along the body's faces.

As illustrated in FIGS. 1 to 3, module is movable into a plurality of different positions of operative connection adjacent and along faces 21,22. Body 2 has a first body face 21 and a second body face 22, module 3 being movable into a first position of operative connection adjacent to first body face 21 (FIG. 1) and into a second position of operative connection adjacent to second body face 22 (FIG. 3). Moreover, body 2 has a third body face opposite first body face 21, module 3 being movable into a third position of operative connection adjacent to third body face (FIG. 2).

Module 3 is movable into an infinite number of different positions of operative connection from adjacent first body face 21 over second body face 22 to the third body face opposite first face 21. Alternatively, module 3 could be movable into a limited number of different positions, e.g. exclusively the positions shown in FIGS. 1 to 3 namely 3 positions.

Module 3 has a module face 33 generally tangential to the body faces 21,22 in said plurality of different positions of operative connection. The module's face could be parallel thereto, e.g. when module and body have flat faces or concentrically arranged faces.

Module 3 is connected to body 2 by a rigid connection device 10. Connection device 10 has a pivotable bearing element 13 assembled to body 2, a connector 11 for module 3 and an arm 12 extending therebetween. Connection device 10 includes a communication channel 15 extending from body 2 to module 3. Channel 15 is configured to guide a liquid between module 3 and body 2. A channel may be provided to guide energy, such as information and/or power, between module and body. For instance, module 3 is a milk frothing device, e.g. of the type disclosed in WO 2008/142154, WO 2010/023312 and WO 2010/023313, which is fed with energy and/or steam via corresponding channel(s) in the connecting device.

Channel 15 may be connected to body 2, e.g. at the level of element 13, by a flexible connector, such as a flexible cable and/or by a flexible tube, or by a rigid connector with a bearing.

Module 3 comprises a supply reservoir 31 with a lid 32 for supplying an ingredient, in particular a liquid such as water, to body 2 via channel 15 of connection device 10. The module could also be arranged for collecting waste material from the machine's body.

The invention claimed is:

1. A beverage preparation machine comprising:
a body having one or more outer faces and a beverage outlet for delivering a beverage over a beverage dispensing area;
an inlet channel configured for a capsule containing a beverage ingredient to be inserted therethrough; and
a module operatively connected to the body adjacent to one of the one or more outer faces,
the module is movable into a plurality of different operative connection positions along the one or more outer faces of the body and is operatively connected to the body by a connection device, the module comprising a component selected from the group consisting of (i) a supply reservoir configured to supply a liquid to the body through a channel extending through the connection device and (ii) a collection reservoir configured to collect waste material from the body, and the module having a dedicated sub-function and being in position for carrying out the dedicated sub-function when in the operative connection positions,
the connection device comprises a pivotable element connected to the body, a connector attached to the module, and a rigid arm extending from the pivotable element to the connector,
the rigid arm extends from the body at an angle, and the connection device is configured to vary the angle.

2. The machine of claim 1, wherein the module is translationally movable along the one or more outer faces.

3. The machine of claim 1, wherein the module is rotatably movable around the body.

4. The machine of claim 1, wherein the module is movable into a plurality of different positions of operative connection adjacent and along a body face.

5. The machine of claim 1, wherein the body has a first body face and a second body face, the module being movable into a first position of operative connection adjacent to the first body face and into a second position of operative connection adjacent to the second body face.

6. The machine of claim 1, wherein the module is movable into an infinite number of different positions of operative connection.

7. The machine of claim 1, wherein the module is movable into a limited number of different positions of operative connection.

8. The machine of claim 1, wherein the module has one or more module faces, the module face and the body face being generally parallel or tangential in the plurality of different positions of operative connection.

9. The machine of claim 1, wherein the connection device includes a communication channel extending from the body to the module.

10. The machine of claim 9, wherein the connection device is selected from the group consisting of an electric connection with a bearing, a fluid connection with a bearing, and a combination thereof.

11. The machine of claim 1, wherein the module comprises a storage reservoir for a use selected from the group consisting of storing a supply of ingredient for the body, collecting waste material from the body, and a combination thereof.

12. The machine of claim 11, wherein the module comprises a collection reservoir for collecting waste material from the body.

13. The machine of claim 11, wherein the module comprises a supply reservoir for supplying an ingredient.

14. The machine of claim 1, wherein the body has a first body face and a second body face, the module being movable into a first position of operative connection adjacent to the first body face and into a second position of operative connection adjacent to the second body face, the body having a third body face, the module being movable into a third position of operative connection adjacent to the third body face.

15. The machine of claim 1, wherein moving along the one or more outer faces of the body comprises moving the module from a first position aligned with a first face of the body to a second position aligned with a second face of the body.

16. The machine of claim 15, wherein the module has a first face parallel to the first face of the body in the first position and a second face parallel to the second face of the body in the second position.

17. A beverage preparation machine comprising:
a body having an outer face and a beverage outlet;
an inlet channel configured for a capsule containing a beverage ingredient to be inserted therethrough; and
a module connected to the body, and
the module is movable into a plurality of different operative connection positions along the outer face of the body and is operatively connected to the body by a connection device, the module comprising a component selected from the group consisting of (i) a supply reservoir configured to supply a liquid to the body through a channel extending through the connection device and (ii) a collection reservoir configured to collect waste material from the body, and the module having a dedicated sub-function and being in position for carrying out the dedicated sub-function when in the operative connection positions,
the connection device comprises a pivotable element connected to the body, a connector attached to the module, and a rigid arm extending from the pivotable element to the connector,
the rigid arm extends from the body at an angle, and the connection device is configured to vary the angle.

* * * * *